United States Patent [19]

Klamm et al.

[11] 4,055,252

[45] Oct. 25, 1977

[54] CONTAINER LIQUID LEVEL DETECTOR APPARATUS

[75] Inventors: Robert L. Klamm, St. Charles; Maurice R. Day, Florissant, both of Mo.

[73] Assignee: Barry-Wehmiller Company, St. Louis, Mo.

[21] Appl. No.: 670,157

[22] Filed: Mar. 25, 1976

[51] Int. Cl.² ............................................. B07C 5/344
[52] U.S. Cl. .................................. 209/74 M; 209/75; 209/111.5; 324/58.5 A
[58] Field of Search ................. 209/73, 74, 75, 111.5, 209/75, 111.5; 324/58.5 A; 325/363

[56] References Cited

U.S. PATENT DOCUMENTS

| | | | |
|---|---|---|---|
| 3,203,546 | 8/1965 | Rydz | 209/111.5 |
| 3,451,546 | 6/1969 | Murley | 209/111.5 X |
| 3,694,737 | 9/1972 | Busker et al. | 324/58.5 A |
| 3,818,333 | 6/1974 | Walker | 324/58.5 A |
| 3,969,228 | 7/1976 | Browning | 209/111.5 X |

Primary Examiner—Robert B. Reeves
Assistant Examiner—Joseph J. Rolla
Attorney, Agent, or Firm—Gravely, Lieder & Woodruff

[57] ABSTRACT

A liquid level detector for electronically examining containers through the use of microwave sensors for determining the presence of liquid in the containers including a mounting member to adjust the position of the detector to accommodate different size containers and a reject station downstream from the position of liquid level detection to discharge a rejected container.

18 Claims, 7 Drawing Figures

CONTAINER LIQUID LEVEL DETECTOR APPARATUS

BACKGROUND OF THE INVENTION

This invention is concerned with rapid inspection of containers to be certain that foreign matter is not present before the containers are conveyed to filling equipment. Great care has to be exercised before filling containers with beverages or food stuffs that no contaminants are present. It is known that empty and some not empty containers are used as receivers for all manner of objects, some of which are difficult to remove. Washing apparatus has been devised to subject containers to strong caustic washing solutions which generally dislodge foreign objects and sterilize at the same time. Such washing apparatus is usually equipped with a final rinse section which is supposed to flush out the caustic wash solution so that the containers emerge in clean and sterilized condition. In order to be certain of the final condition of the containers an inspection step is imposed. Such an inspection step can be performed by the apparatus disclosed in U.S. Pat. No. 3,191,773 which is adapted to handle a continuous stream of containers and pass them through an inspection station where each container is illuminated and looked at by photoelectronic means with the aid of optical means. Another inspection apparatus that may be applied is disclosed in U.S. Pat. No. 3,133,640.

BRIEF DESCRIPTION OF THE INVENTION

This invention is concerned with inspectin containers for the detection of residual fluids that may be present, either as the result of incomplete drainage after washing or as the result of some other treatment performed on the containers.

It has been found that some containers delivered from washers are not entirely empty of the caustic solution or the rinse water, thereby posing the problem of contaminating the material to be placed in the containers. In some cases the residual caustic or rinse fluid is not sufficient to cause problems with humans, but can affect the contents by changing the taste or other characteristic thereof.

Therefore, the objects of this invention are to provide apparatus which will rapidly and accurately detect the presence of fluid in containers and operate reject mechanism to remove such containers from the conveying means; to effect the detection by microwave sensors placed in position to examine the containers while being conveyed; and to provide means of simple construction to adopt the microwave sensors to inspect containers of different sizes and to actuate the reject means.

A preferred embodiment of the present invention is in the form of an attachment or accessory to the container inspection apparatus disclosed in U.S. Pat. No. 3,191,773. Such an attachment comprises transmitter and receiver sensors on opposite sides of the path of container conveyance, means mounting the sensors for precise positioning to obtain the optimum effect of the microwave beam, and timing and control means to obtain the desired microwave beam scan of the containers and the desired operation of reject mechanism when the beam scan detects the presence of an excess of fluid.

An equally preferred embodiment of the present invention comprises means for determining the presence of the contents in a non-metallic container which includes means for generating a continuous microwave beam, means for receiving the microwave beam after passing through a container, means responsive to the reception of the microwave beam to generate a signal indictive of the presence of the container and the contents therein, and means establishing a predetermined signal value for comparison with the value of the signal generated by the presence of the container and its contents.

BRIEF DESCRIPTION OF THE DRAWINGS

The presently preferred embodiment of this invention is illustrated in the accompanying drawings, wherein.

DETAILED DESCRIPTION OF THE INVENTION

Figure 1:
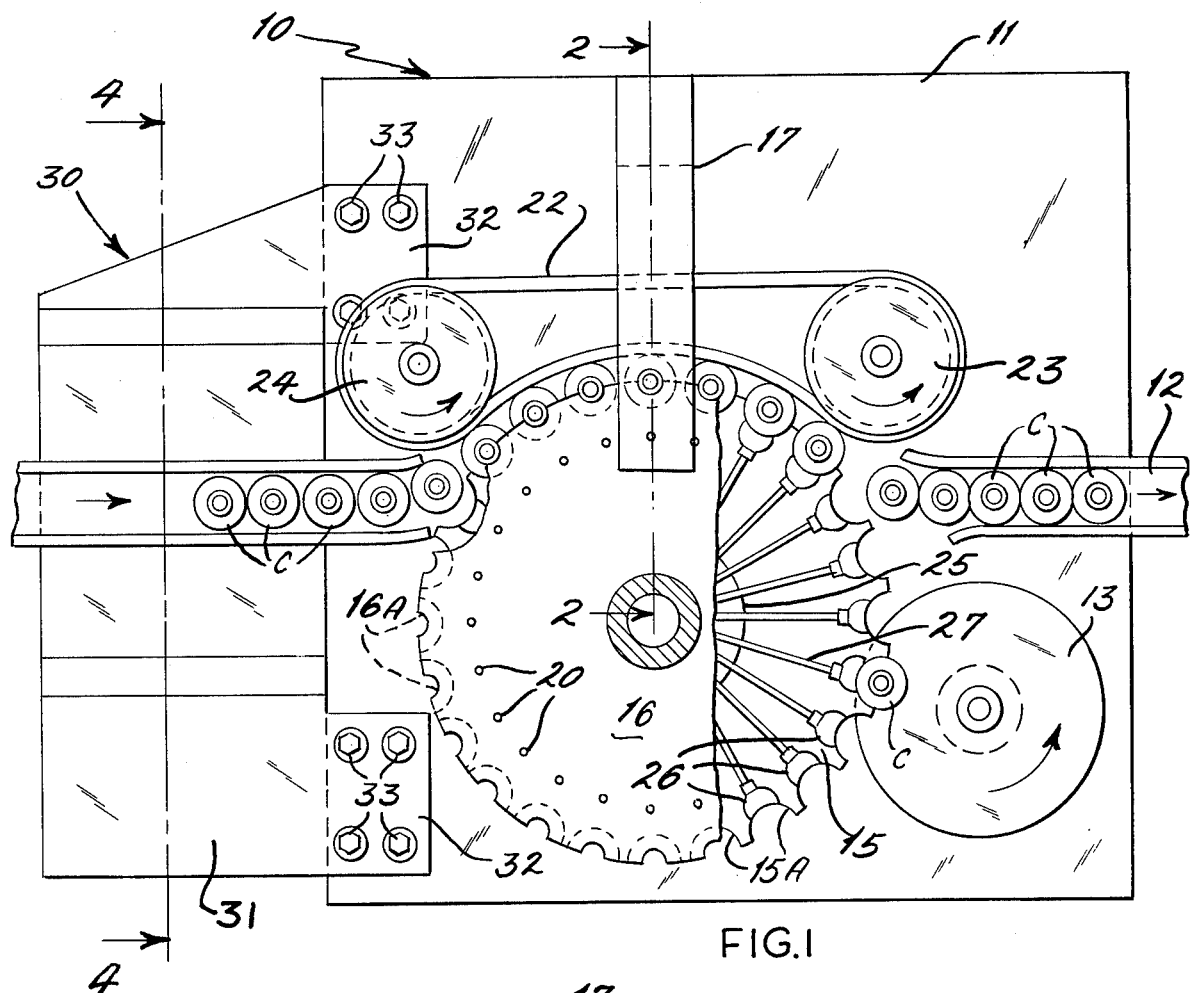
FIG. 1 is a plan view of apparatus which includes container inspection means having separate discharges for acceptable and rejected containers, means to move rejected containers through the discharge, and liquid level detection means operable to influence the means to move rejected containers through the discharge.
Figure 2:
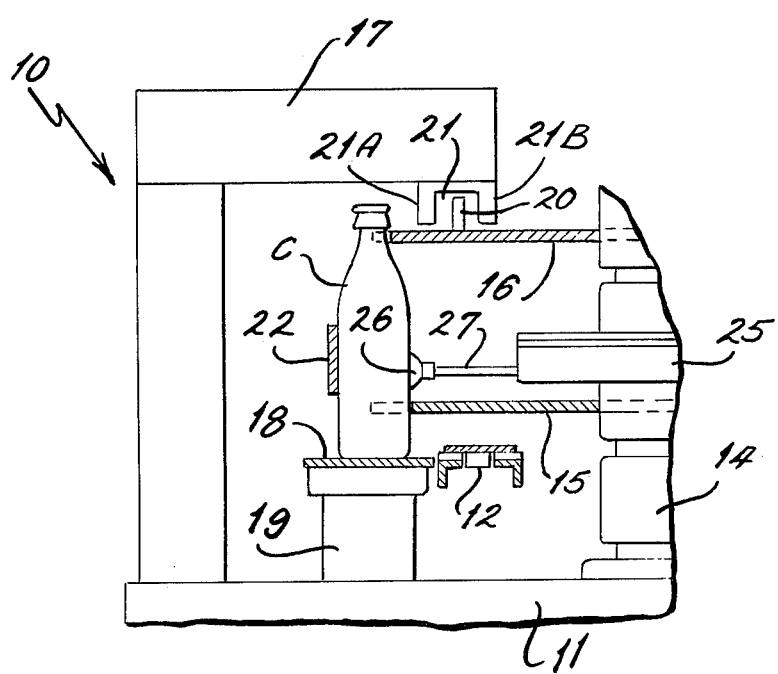
FIG. 2 is a fragmentary elevational view of the container sensor device located adjacent the place where final inspection occurs.

Referring to FIGS. 1 and 2 it can be seen that a container inspection means 10 is organized on a floor supported cabinet 11 containing the operating means for components requiring motion to move containers through the apparatus 10 either to continue on conveyor 12 or to be side tracked on to a container reject support 13. The top of the cabinet 11 is traversed by the container conveyor 12 which passes to one side of a vertically projecting post 14 operatively supporting free wheeling star wheels 15 and 16. The lower star wheel 15 has recesses 15A in its periphery to receive the body of containers. The upper star wheel 16 has smaller peripheral recesses 16A to receive the neck of containers. The star wheel recesses 15A and 16A are vertically aligned to properly position the containers for being inspected by suitable means (not necessary to show) contained in the head box 17 positioned above the inspection zone defined by a transparent or opalized glass plate 18 set over a light source 19 for illuminating the interior of each container C as it passes over the plate.

The container inspection means 10 is thoroughly described in U.S. Pat. No. 3,191,773, and the disclosure thereof is incorporated in this disclosure by reference so as not to duplicate the details. In this prior patent provision is made for triggering the reject mechanism in response to the determination that there is some foreign matter in the container. The reject mechanism, in accordance with the requirements of the present invention is also made responsive to the inspection of containers by the micro-wave sensors, and the operative connection is broadly illustrated in FIG. 6 of the drawings. However, while the apparatus of said patent incorporated a rotary star wheel to signify when a container had reached the inspection zone, the present disclosure varies from that in the following respects. The upper large star wheel 16 is provided with position sensing pins 20 centered to the respective container recesses 16A. Each pin 20 is set on the circumference of a circle which passes centrally below a pick-up head 21. The pick-up head 21 is bifurcated whereby a light source may be carried in one furcation 21A and a photosensitive element may be carried in the spaced furcation 21B. The light beam traverses the space through which each position sensing pin 20 must pass; and a signal is generated by the photosensitive element to indicate that a container has reached the inspection zone, and each signal triggers the operation of the inspection means in the head box 17. As containers are conveyed into the star wheel recesses 15A and 16A they are held by a suitable belt 22 operatively carried by spaced pulley 23 and 24. The belt 22 supports the containers so the bottoms will be unobstructed for passing the illumination from the light source 19. In addition, the star wheel supporting post 14 carries a vacuum head 25 supplied with a vacuum suction cup 26 and connecting tube 27 for each container recess (FIG. 1).

Figure 3:
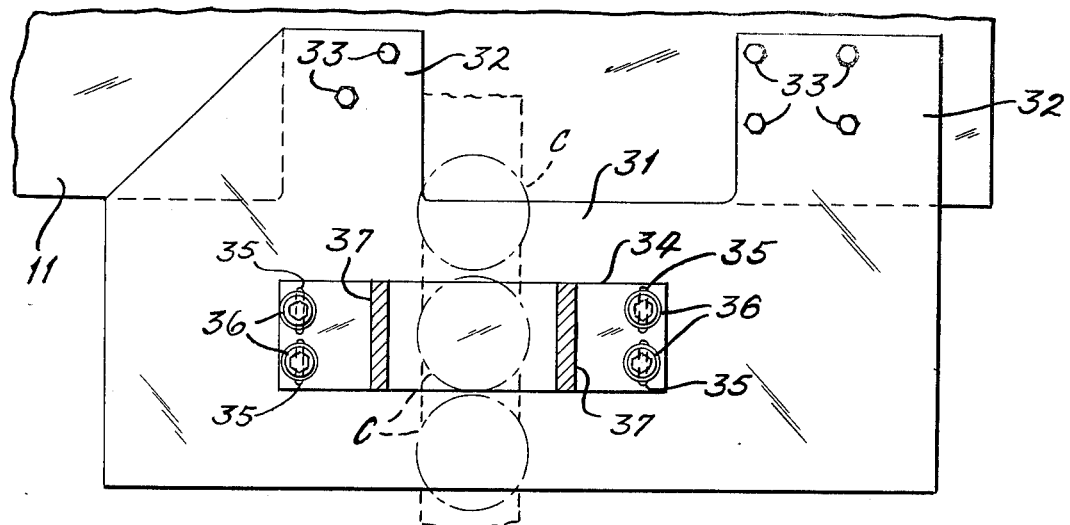
FIG. 3 is a fragmentary plan view of the shelf which supports the detection means of this invention, and the adjustable base for the microwave guide assembly.
Figure 4:
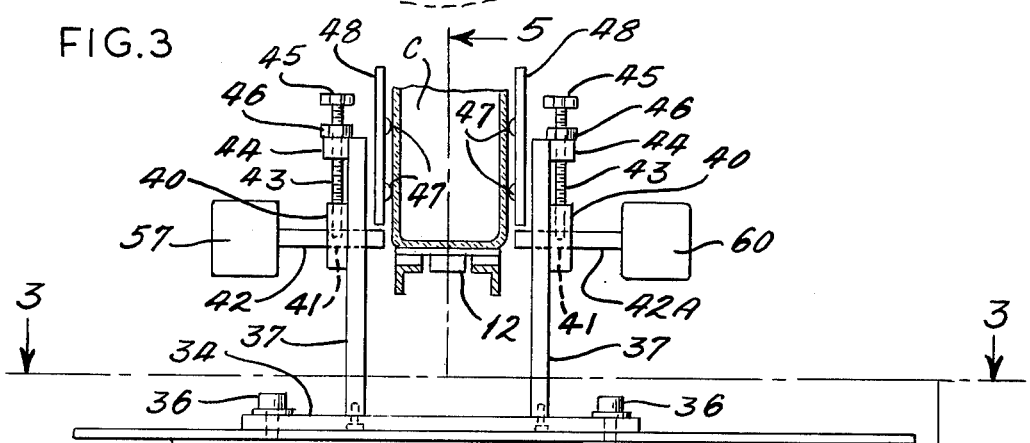
FIG. 4 is a sectional view of the mounting provisions for the detection means, the view being taken at line 4—4 in FIG. 1.
Figures 5, 6:
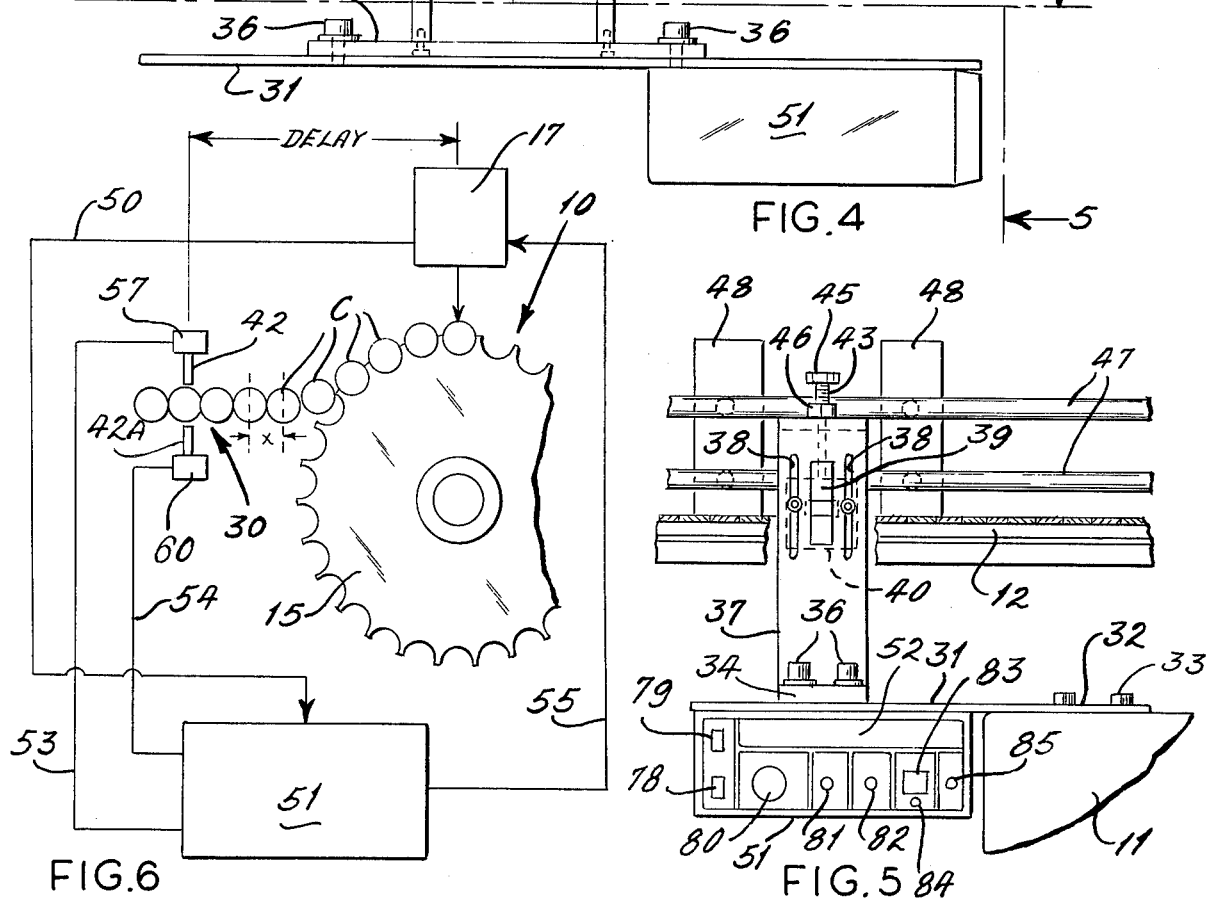
FIG. 5 is a fragmentary view of the mounting means for the electronic means embodied in the present invention.
FIG. 6 is a schematic plan view of the organization of the mechanical and electronic components.

It can be seen generally in FIG. 1 that the cabinet 11 supports at the infeed side of the container inspection means 10 the liquid level detector 30 forming the principal apparatus of this invention. The detector 30 is mounted by a shelf plate 31 secured by extensions 32 and threaded elements 33 to the top of the cabinet 11. The detector means 30, as seen in FIGS. 3, 4 and 5, is made up of a base plate 34 having a plurality of slots 35 by which it can be positionally adjusted to change its location within a range of up to seven-eighth inch. Threaded elements 36 retain the plate 34 in adjusted position. The plate 34 carries a spaced pair of vertically erect micro-guide plates 37 which have a pair of vertically elongated slots 38 near the upper ends. The slots 38 in each plate 37 are spaced apart to allow space for the forming of an opening 39 (FIG. 5) for a purpose to appear. A sensor holder block 40 formed of an insulation material, like PVC, is mounted against the face of each plate 37 by threaded elements passing through the slots 38 and engaged in the holder blocks 40. Each block 40 is formed with an aperture 41 of suitable shape to receive a wave guide horn and move the horn as the block is moved. The horns are indicated at 42 and 42A.

The respective sensor holder blocks 40 are each suitable connected to the lower end of a threaded adjusting screw shaft 43, while the upper portion of each shaft 43 is threadedly engaged in a fixed block 44 carried by the microguide plate 37. Each shaft 43 extends out of the fixed block 44 to receive a knob 45 and a securing nut 46. The nuts 46 must be loosened in order to manipulate the knobs 45 and change the vertical positions of the horns. It can be seen in FIG. 4 that the horns 42 and 42A are positioned on opposite sides of the space between the fixed plates 37 and adjacent the elevation of the conveyor 12 which carries the containers through the space, guided by suitable side fence rails 47 supported by vertical stanchions 48. While the horns 42 and 42A can be vertically adjusted by knobs 45, the entire assembly which supports the horns 42 and 42A can be horizontally shifted by moving the base 34 as before noted. These two adjustments allow the horns to be located as desired relative to the bottom end of the containers C carried by conveyor 12 between the horns, thereby affording precise settings of the horns relative to the containers without the need to touch the containers. It is understood that the adjustment of the horns 42 and 42A is determined by the configuration of the bottom area of the containers being inspected, whereby an average setting can be selected predicated on the minimum permissible residual liquid.

Turning now to FIG. 6 there is shown a schematic view of the container liquid level detection system as it is applied to the container inspection means 10. It has been pointed out in FIG. 2 that as each container C reaches the inspection station a corresponding pin 20 on the upper star wheel 16 will break a light beam in the pick-up head 21, and that will generate a signal in the circuit contained in the head box 17, and that signal will be transmitted by lead 50 to electronic circuitry contained in housing 51. The electronic housing 51 as seen in FIGS. 4 and 5 is mounted on the underside of the shelf 31 so as to present its control panel 52 in position for convenient access and viewing. The electronic circuit in housing 51 is connected by a lead 53 to the microwave transmitter horn 42 and by lead 54 to the microwave receiver horn 42A. The electronic means in housing 51 processes the result of the microwave detector effect on the containers and if a container is found to be unacceptable a reject signal is transmitted by lead 55 back to the electronic circuit in head box 17 which thereafter energizes the vacuum system so that the suction cup 26 is caused to retain and remove from conveyor 12 the unacceptable container when that particular container reaches the inspection station in inspection means 10. The cooperation between the operation of the inspection means 10 and the liquid level detector 30, represented by the horns 42 and 42A, requires a precise spacing so that a known whole number of containers occupies the space between the inspection station of means 10 and the inspection zone position of containers substantially centered between the horns 42 and 42A. In the view of FIG. 1 it is assumed that there are 9 containers C between the inspection station in the inspection means 10 and the inspection zone in the liquid level detector 30. If it is assumed that the container in the liquid level detector 30 is found to be unacceptable, the electronic circuits in the housing 51 will operate to count off 8 signal pulses delivered by lead 50 and on the 9th pulse a signal transmitted through lead 55 will call for the electronic circuit in the head box 17 of inspection means 10 to activate the vacuum cup 26 and reject the container in that inspection station.

The liquid level detector 30 is made adjustable as to spacing from inspection means 10 so as to accommodate different sized containers that may be conveyed for inspection. The adjustment is necessary in order to make the counting circuits perform the necessary function to call at the proper time for container rejection by the rejection means in the inspection unit 10. The counting function is best performed when the containers are in touching relation, and appropriate means not disclosed, is provided to cut off the inspection function if a gap occurs in the supply of containers brought to the inspection means 10 by the conveyor 12. The liquid level detector 30 may not call for rejection of a container, but the inspection means 10 may from time to time reject a container which is found to be unacceptable in accordance with the character of inspection being performed thereby.

The liquid level detector 30 operates on the microwave principal of sensing residual liquid or the liquid level remaining in a glass container C and it incorporates electronic circuitry for analyzing a continuous pulse modulated microwave beam during a sample time synchronized with the timing pulse generated at the inspection means 10 when a container reaches the inspection station. The method employed is one utilizing a shift register memory in conjunction with the detected microwave signal level, the timing pulse from the inspection means 10 and the rejection system embodied in the inspection means 10, whereby a container holding an excessive residual or unacceptable quantity of liquid is rejected and removed from the conveyor means 12 at the reject table 13 (FIG. 1).

Figure 7:
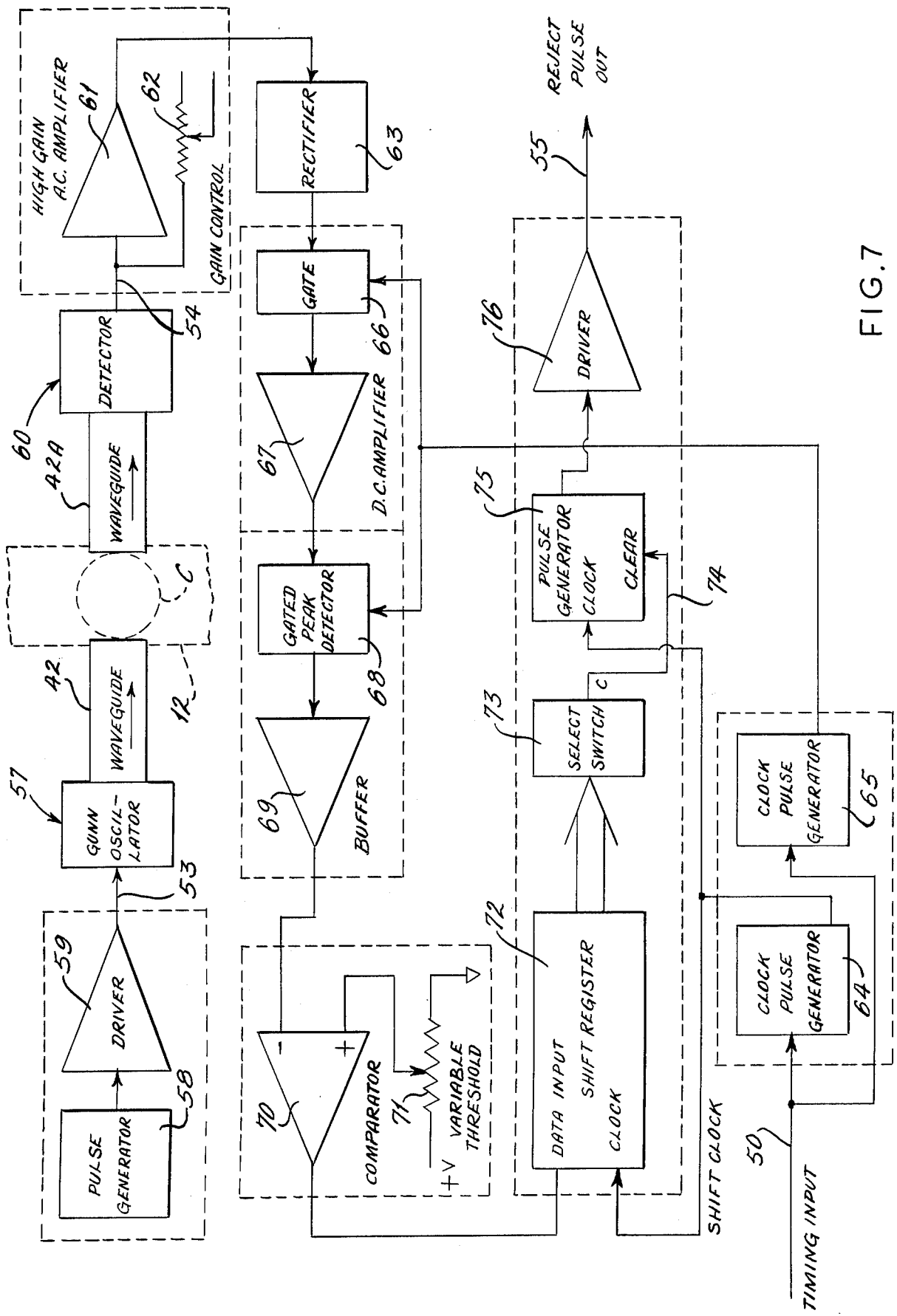
FIG. 7 is a general block diagram of the electronic circuit forming part of the present invention.

The microwave transmitter is shown generally in FIG. 6 in association with the inspection means 10, and is set forth in greater detail in FIG. 7. The transmitter continuously emits 10.525 Ghz microwave radiation modulated at 1 Khz 10% duty cycle which is directed by the waveguide horn 42 across the conveyor 12 toward a receiver waveguide horn 42A. The received signal strength varies in amplitude according to the dielectric constant of the intervening material. Conductive material, such as liquid in a glass container, will decrease the signal level in proportion to the quantity of such material. The received signal is amplified through a variable high gain A.C. amplifier in order to accommodate variations in gain of transmitting and receiving units.

As a given container passes through the microwave beam, the received signal level varies from a minimum at the leading edge to a maximum at the center to a minimum again at the trailing edge due to curvature of the glass. Therefore, the received signal is sampled only during that time interval in which the approximate center of the container C is passing between the horns 42 and 42A. This is accomplished by ensuring that the center of each container C is mechanically aligned with the horns 42 and 42A simultaneously with the generation of a timing pulse by the action of pins 20 within the inspection means 10 (See FIG. 2). The leading edge of the timing pulse from the inspection means 10 is used to generate a 40 millisecond duration sample pulse during which the received signal is sampled.

Peak detection allows immunity to spurious drops in the received signal level such as might be due to water droplets on the outside of the container, curvature of glass, and variations in the dielectric constant of the glass. The received signal level must be low throughout the entire duration of the sample time in order for the analog output voltage of the peak detector to be low at the end of the sample time. This situation will only be encountered in the case of residual liquid of 5 mm depth or greater in the container, assuming proper height adjustment of the horns 42 and 42A. A low analog signal level relative to a given adjustable threshold level will result in a logic "one" output from a level comparator. A high analog signal level will result in a logic "zero". The logic "one" is a reject condition.

The logic levels from the comparator are delayed through a shift register. The delay is necessary since there is some fixed distance between the microwave inspection zone where detection occurs and the inspection means 10 rejection station where the rejection occurs. This time difference is always defined by a fixed number of timing pulses depending upon the number of container centers X (see FIG. 6) between the microwave inspection zone at horns 42 and 42A and the inspection and reject station in inspection means 10 (see FIG. 6). Since this center to center distance X may vary with different diameter containers, the delay is electronically adjustable by selecting the proper number of timing pulses between detection and rejection. After this fixed delay following the detection of liquid in a bottle, a pulse is sent to the inspection means 10 to activate the reject vacuum cup means 26 which causes that container to be rejected.

The block diagram of FIG. 7 shows the preferred electronic circuit contained generally in the housing 51 supported under shelf 31 attached to the cabinet 11. It can be seen that a Gunn Oscillator 57 is connected to the horn 42 of the transmitter and receives its energy through lead 53 from a 1 Khz 10% duty cycle pulse generator 58 and amplifier 59. The receiver for the transmitted microwaves is the horn 42A connected to detector means 60. The received signal is conducted by lead 54 into the circuitry in housing 51 where it connects into a variable high gain A.C. amplifier 61 with a gain control potentiometer 62. The amplifier signal is fed into a rectifier 63. At this stage in the circuit a timing pulse from the inspection means 10 is supplied by lead 50 (FIG. 6) through pulse generator clocks 64 and 65 to gate 66 on the incoming signal side of the D.C. amplifier, and to a peak detector gate 68. The positive pulses from the D.C. amplifier are coupled to the gated peak detector 68 where the peak detector output voltage is held at zero except during the sample time (which is a 40 msec pulse during the received signal) through the use of a transistor switch within the peak detector 68. During the sample time, the peak detector generates an analog signal equal in amplitude to the peak value of the maximum pulse amplitude occuring within the sample time. The analog output of the peak detector is buffered at 69 and fed to a comparator 70 which compares the peak detector output with an adjustable threshold level selected by means 71. The threshold means 71 generates a logic "1" or "0", depending upon whether the analog signal from the peak detector 68 is less than, or greater than, the threshold setting. A positive-going clock edge (which is a 30 msec pulse) is generated by pulse generator clock 64 and that clocks data from the comparator 70 into a shift register 72 towards the end of the sample time, and at the same time advances all previously entered data one position. The positive going pulse generator 65 produces the 40 msec sample pulse as noted above. A 16 position switch 73 is provided to permit selection of one of sixteen different pickoff points from the shift register 72 resulting in a variable data delay. The delayed data is fed to the clear input 74 of the pulse generator clock 75, and the shift clock 64 is applied to the input of the pulse generator clock 75. The output of the latter clock 75 is buffered by the driver 76 and produces a reject pulse which is fed by lead 55 to the reject means in the inspection means 10.

The electronic housing 51 (FIG. 5) presents its panel 51 for easy access and viewing. The panel carries a power switch 78 for energizing the microwave assembly, and a panel light 79 indicates when the power has been turned on. The sensitivity control for the variable threshold means 71 is in the knob 80. When each container C is being scanned by the microwave beam a light 81 will go on, and the adjacent light 82 will indicate a rejected container. The member of rejected containers in totalized on the counter 83 which has a reset button 84. Since it is important to know the number of containers between the microwave inspection zone and the inspection station, for each container size, the select switch 73 (FIG. 7) is controlled by the panel knob 85.

The foregoing description has set forth a presently preferred embodiment having the unique features of microwave signal sensing and programmable digital tuning and control circuitry. The microwave sensors consist of transmitter and receiver positioned in aligned spaced relation in a nonmetallic container inspection zone. The sensors do not touch the containers but perform the sensing function while the containers are moving at up to about 800 containers per minute. The microwave signal or beam passes through the containers and has a frequency of 10 Ghz and power of less than one milliwatt per centimeter squared. The received signal strength is affected by the dielectric constant of the material or media between the sensors. As an example, the dielectric constant for water is approximately 80 compared to the constant 2.5 for glass. This large difference in dielectric constant permits the microwave signal sensing means to be ideally suited for the detection of residual caustic or water in the containers. As seen in FIGS. 3, 4 and 5, the horns 42 and 42A are independently operably mounted so as to be precisely located and adjusted vertically by knobs 45. In addition the mounting base 34 is adjustable so the horns 42 and 42A can be moved horizontally to accommodate different size containers, but it is not the intent to convey a haphazard mix of container sizes.

While the microwave scanning means of FIGS. 6 and 7 is combined with the container inspection means 10, seen generally in FIG. 6, it is to be understood that the unique result of the foregoing described apparatus is the detection of an unacceptable container by microwave sensing means, and in the arrangement where the microwave sensing means and the containers may have relative movement in which it is generally expected that the microwave sensing means will be held stationary while the containers are moved relative to it. It is also understood that another unique result is in the combination of utilizing rejection means embodied in the inspection means 10 in conjunction with means for counting off the number of containers between the rejection means and the microwave inspection zone so as to simplify the overall arrangement of components.

What is claimed is:

1. In a container contents detector means for determining the presence of contents in a non-metallic container, first means generating a microwaave beam, means moving a container across the microwave beam for determining the presence of contents therein, a second means spaced from said first means and detecting the microwave beam pasing through the container, said first and second means being out of touching relation with the containers, means responsive to the reception of the microwave beam by said second means to generate a signal indicative of the presence of a container and the contents in the container, and means establishing a predetermined reference value for comparison with said signal generated by said second means representative of the presence of a container and its contents.

2. The container contents detector means set forth in claim 1 wherein the presence of liquid in the container is sensed directly and independently of the character of the container.

3. The container contents detector means set forth in claim 1 wherein said container is in motion and said signal detecting means generates signals representative of the maximum value of the energy passing through the container, and means to compare said maximum energy value with said predetermined reference value.

4. The container contents detector means set forth in claim 1 wherein said means establishing a predetermined reference value is programmed for a container that has a maximum permissible contents.

5. The container contents detector means set forth in claim 1 wherein said means establishing a predetermined reference value is programmed for an empty container.

6. The container contents detector means set forth in claim 1 wherein said means establishing a predetermined reference value for comparison with said signal generated by said second means is adjustable and comparing means for generating a logic one or zero, depending upon the value of said signal generated by said second means being respectively less than or greater than said predetermined reference value.

7. In apparatus to inspect a succession of containers for residual liquid and for foreign objects, the combination of: foreign object inspection means definng an inspection station, means emitting a signalling pulse to indicate the arrival of a container in said inspection station, and means in said inspection station to inspect a container for foreign objects and to generate a pulse upon responding to the presence of a foreign object to reject a container containing a foreign object; residual liquid detection means defining a residual liquid inspection zone, energy transmitting means in said inspection zone, energy detecting means opposite said transmitting means, and analyzer means connected to said energy detecting means to analyze changes in the energy detected; and means connecting said analyzer means with said reject means in parallel with said foreign object inspection means, said energy transmitting means and energy detecting means inspecting each container in said inspection zone and means for continuously counting the successive containers passing said inspection zone, whereby a container detected with residual liquid and moved from said inspection zone into said inspection station is rejected by said reject means in said foreign object inspection means.

8. The apparatus set forth in claim 7 wherein said inspection station and inspection zone are spaced an integral number of containers apart for a given container size.

9. The apparatus set forth in claim 7 wherein the energy source for said transmitting means is a pulse modulated microwave beam, and said analyzer means is rendered functional during each emitted signalling pulse from said foreign object inspection means.

10. The apparatus set forth in claim 7 wherein a common conveyor means moves containers through said inspection station and inspection zone, said station and zone being spaced apart a fixed distance for a given container size.

11. The apparatus set forth in claim 7 wherein said residual liquid detection means is attached to said foreign object inspection means, and said inspection station is downstream from said inspection zone.

12. In apparatus to inspect a succession of containers for residual liquid and for foreign objects, the combination of: first means to inspect containers for foreign objects, said first means defining an inspection station through which all containers must pass; signal means adjacent said inspection station emitting a pulse for each container arriving in said inspection station; second means to inspect containers for residual liquid, said second means defining an inspection zone through which all containers must pass; signal means connected to said second container inspecting means generating a signal pulse for each container; counting means responsive to said first and second signal pulses, said counting means including a shift register memory operative upon the finding of residual liquid in a container; a container reject mechanism in said first means; and a shift register controlled connection between said counting means and said reject mechanism to activate said reject mechanism upon arrival of the container containing residual liquid at said reject mechanism.

13. In apparatus to inspect containers for foreign objects including signal means to indicate the arrival of each container at a foreign object inspection station and means to reject a container having foreign objects, the improvement therewith of an attachment to inspect the same containers for liquid content, said attachment comprising: first means located in an inspection zone and generating a microwave beam aimed at the containers, second means in the inspection zone detecting the microwave beam passed through the container, means activated in response to the detection of the microwave beam by said second means to emit a signal proportional to the contents of liquid in the container, means to sample the emitted signal representing the liquid contents in each container for a predetermined time span and means to compare the emitted signal against a predetermined minimum reference level, said signal comparing means activating said container reject means upon said emitted signal exceeding said predetermined minimum reference level, and counting means controlling the time of activation of said container reject means at the foreign object inspection station in response to the number of containers activating said signal sampling means.

14. The container liquid content inspection attachment set forth in claim 13 wherein said first and second means are spaced from the container and out of touching relation, and the presence of liquid in the container is sensed directly and independently of the character of the container.

15. The container liquid content inspection attachment set forth in claim 13 wherein said signal generating means generates signals representative of the highest value of the signal passed through the container, said highest signal value being fed to said comparing means within said predetermined time span.

16. The container liquid content inspection attachment set forth in claim 13 wherein said means establishing a predetermined maximum reference level is programmed for a minimum permissible liquid content in the container.

17. The container liquid content inspection attachment set forth in claim 13 wherein said means establishing a predetermined minimum reference level is programmed for an empty container.

18. The container liquid content inspection attachment set forth in claim 13 wherein said means establishing a predetermined minimum reference value for comparison with said signal generated by said second means is adjustable and said comparing means generates a logic one or zero, depending upon the value of said signal generated by said second means being respectively less than or greater than said predetermined minimum signal level.

* * * * *